April 9, 1929.  E. W. LARSEN  1,708,674
STEAM GENERATOR
Filed April 12, 1926   2 Sheets-Sheet 2

Inventor:
Einer W. Larsen
By Fred Gerlach
his Atty.

Patented Apr. 9, 1929.

1,708,674

UNITED STATES PATENT OFFICE.

EINER W. LARSEN, OF CHICAGO, ILLINOIS.

STEAM GENERATOR.

Application filed April 12, 1926. Serial No. 101,242.

The invention relates to the generation of steam.

One object of the invention is to provide an improved system for generating steam, in which the highest possible economy in consumption and thermal efficiency are attained.

Another object of the invention is to provide an improved generator in which the products of combustion and the water, which is vaporized to form steam, are brought into direct contact, so that substantially all of the heat units in the fuel will be utilized.

Another object of the invention is to provide an improved steam generator which is simple in construction and efficient in operation and in which a comparatively small retort suffices for the generation of large volumes of steam.

Another object of the invention is to provide an improved generator which is adapted for producing steam for heating and power purposes.

The invention consists in the several novel features hereinafter set forth and more particularly defined by claims at the conclusion hereof.

Figure 1:
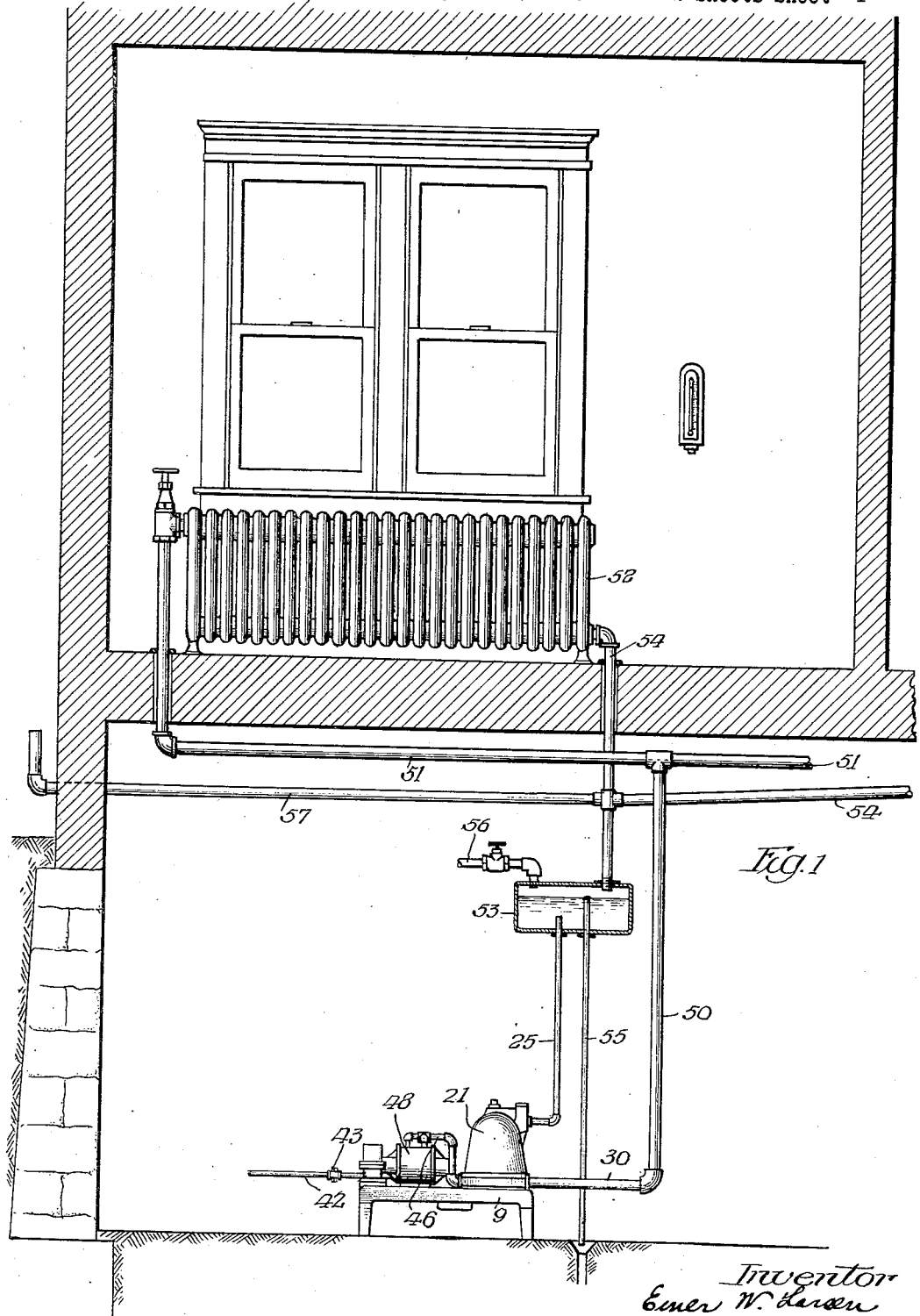
Figure 2:
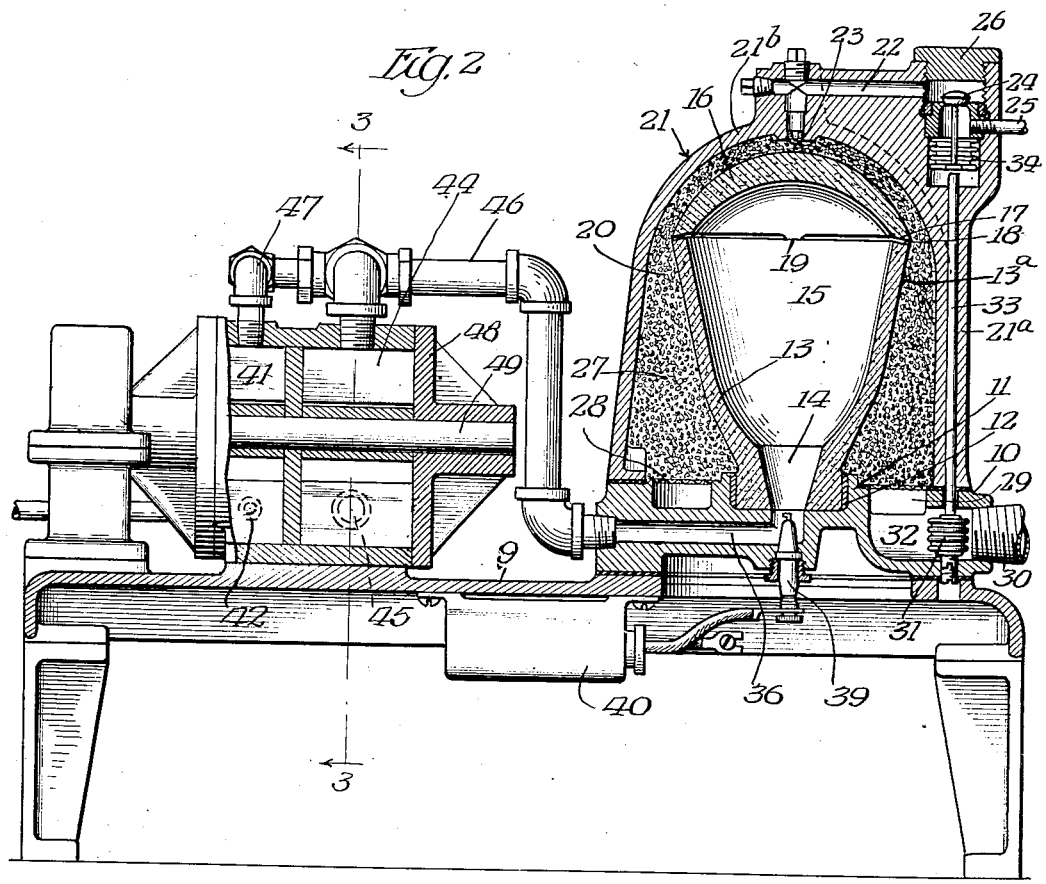
Figure 3:
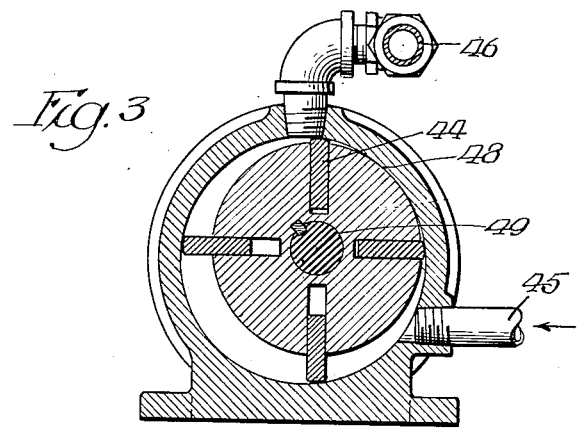

In the drawings: Fig. 1 is a view, illustrating the invention in connection with a heating system for buildings. Fig. 2 is a longitudinal section of the generator. Fig. 3 is a section on line 3—3 of Fig. 2.

The invention is exemplified in a structure comprising a frame 9 which may be of any suitable construction. The generator and the mechanism for forcing fuel and air into the combustion chamber are mounted on said frame to form a simple, compact generating unit.

The generator comprises a base 10 which is bolted to the top of one side of the frame 9, and provided with an annular upwardly extending flange 11 forming a socket 12, in which the lower end of a retort or fire-box 13 is held. This retort is preferably formed of refractory and porous material, such as fire clay, is provided at its lower end with a central upwardly flared fuel and air inlet 14, and its wall 13ᵃ is flared upwardly to form a combustion chamber 15. The top of the retort is formed of a spherically concavo-convex dome 16, also of fire-clay. This dome has its annular margin 17 substantially coincident to the upper rim or margin 18 of the wall 13ᵃ of retort 13. The faces of the contiguous margins 17 and 18 are separated slightly by lugs 19 formed on the dome section 16, or notched to form one or more narrow slits or openings, through which the products of combustion will escape into a steam generating chamber 20 which surrounds the sides of, and extends over, the top of the retort. Chamber 20 is formed in a dome-like casing 21 which has its lower end fixedly secured to the base 10 and frame 9, and its annular side wall 21ᵃ and it curved top 21ᵇ are spaced so as to form a generating chamber of the desired capacity. This chamber is substantially filled with carborundum crystals or other heat resisting pieces to distribute the water over a very extensive superficial heated area, and so the products of combustion will mingle with the water to generate steam, without loss of heat units in the conversion, but with a drop in temperature.

A water inlet 22 leads into the top of the top 21ᵇ of chamber 20 which conforms in curvature approximately to the dome 16 of the retort. A screen 23 is provided at the inner end of duct 22 to distribute the water being delivered to the body of crystals 27 in the generating chamber radially and evenly over the dome 16. The supply of water through duct 22 to the generating chamber is controlled by a valve 24 which is suitably mounted in the casing 21 to control delivery of water from a supply pipe 25. A screw-plug 26 is provided at the upper end of the chamber which contains valve 24 to provide access to the valve when desired.

The body of crystals 27 in the generating chamber is supported by a screen or foraminous sheet 28 which extends between flange 11 of the base 10 and the margin of said base. The steam generated in chamber 20 passes out of said chamber through screen 28 into an annular outlet or chamber 29 formed in the base 10. A pipe 30 is connected to chamber 29 to deliver the steam to the desired point of consumption. To automatically prevent the water from being fed into the generating chamber through duct 22 until the temperature in the generating chamber has been sufficiently raised to produce steam, a thermostatic bellows 31, operatively connected to a rod 33, is disposed in a duct 32 which leads from steam outlet 29 to pipe 30. The upper end of said rod is separate from, and adapted to lift, valve 24, which has its stem connected to a bellows 34, so that the rod will not be subjected to the pressure of the water. Bellows 31, when it becomes heated, will automatically expand so as to lift rod 33 and open the valve 24. This exemplifies means for automatically controlling the supply of water to the generating chamber, so as to prevent the water from being fed to it until the retort and generating chamber have been sufficiently heated.

A duct 36 leads from one side of the base 10 to the inlet 14 of the retort. The gas or gaseous fuel is forced through duct 36 into the combustion chamber 15, where it is ignited, and heats the retort wall. The products of combustion escape from the combustion chamber through the slits between the dome 16 and the rim of the retort body 13, into the generating chamber containing the crystals. As a result, there is no waste of fuel. By properly proportioning air with the fuel, complete combustion, without heat losses, will result. The combustion in the chamber 15, not only keeps the parts surrounding the wall at a high degree of heat, but the products discharging under pressure from the combustion chamber through the slits into the generating chamber strike the water coming down over the dome 16, tending to atomize it and spread it outward into the crystals and to turn it into steam in its downward path. If the retort be made of porous material, such as fire-clay, part of the water will be absorbed by it and be converted into steam on the inner or combustion side and pass out through the slits. Inasmuch as the products of combustion are commingled with the stream to conserve all the heat units, no separate outlet for the products is necessary.

A spark plug 39 has its sparking point disposed in the lower end of the retort 13 to ignite the fuel entering the chamber 15. This spark plug exemplifies ignition means for the fuel and is connected to a suitable transformer 40, although it will be understood that any suitable ignition means may be used.

A rotary pump 41 is connected to receive gas or gaseous fuel from a pipe 42 under control of a check-valve 43 which opens only by the suction of the pump 41. A similar rotary pump 44 is connected to receive air from a pipe 45 and to discharge it into a pipe 46 which is connected to deliver the mixed air and gas to the inlet duct 36. The discharge pipe 47 of pump 41 is connected to deliver the fuel into the pipe 46, so that the fuel will be mixed with the air, both of which are under pressure in transit to the combustion chamber. Both of the pumps may be contained in a unitary casing 48, the air and fuel chambers being independent of one another. The rotors of both pumps are mounted on a common shaft 49 which is driven usually by suitable reducing gearing and an electric motor (not shown), usually mounted on frame 9.

In operation, the pumps 41 and 44 will force fuel, such as gas and air under pressure, into the combustion chamber 15. The air and gas are properly proportioned, for efficient and substantially complete combustion of the fuel. In the combustion chamber, the fuel will ignite and heat the retort walls to a very high temperature, and the products of combustion will be delivered directly into the chamber 20 containing the crystals over which the feed water will be finely spread, so that it will be quickly converted into steam. The carborundum crystals will be thoroughly heated, both from the walls of the retort and directly from the products. The steam, generated in the crystal-filled chamber, will pass through screen 28 to the pipe 30 which will deliver the steam to the point where it is to be consumed for heating or the generation of power. The thermostatic bellows 31 will automatically control the inlet of the feed water, so that no water will pass into the generating chamber until it and the crystals therein have been sufficiently heated to flash the water into steam. In practice, an insulating jacket, not shown, is usually placed around the casing 21 as well understood in the art.

The invention exemplifies a generator for steam, in which the water is heated, both through the walls of the fire-box or retort, and by direct contact with the products of combustion from the retort, to avoid heat losses, such as usually result in common boiler practice from incomplete combustion in the combustion chamber and carrying off the smoke and products of combustion from said chamber through a separate outlet. The crystalline formation in the generating chamber effectively divides the water so that it will be quickly converted into steam. The structure as a whole occupies but little space, as well as attaining the highest thermal efficiency and economy in fuel consumption. The structure is well adapted for heating systems for buildings, as well as other purposes.

In Fig. 1, the invention is illustrated in connection with a heating system for buildings. Steam pipe 30 is connected by pipe 50 and branch pipes 51 to deliver the steam into one or more radiators 52. The water inlet pipe 25 is connected to receive water from an elevated tank 53. The condensate from the radiators 52 is delivered to the tank 53 through return pipes 54 which lead from the discharge end of the radiators. Tank 53 may receive water from a supply line 56 under a suitable control. A pipe 55 is adapted to conduct any excess water in the tank 53 to a drain connection 56. The uncondensed gases in the condensate are exhausted through a pipe 57 which leads to the outside, so that such gases will be eliminated from the water before it is returned to the generator.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a steam generator, the combination of a retort comprising an upwardly flared annular wall and a separately formed dome forming a combustion chamber, means for forcing air and fuel under pressure into the retort, a substantially cylindrical casing extending around the wall of the retort and having a top extending over the dome and forming an annular generating chamber, the retort having a duct for discharging the products of combustion into the generating chamber, means for delivering feed-water into the top of the generating chamber, and an outlet for the steam produced in the latter chamber.

2. In a steam generator, the combination of a retort comprising an annular wall and a separately formed dome, means for forcing air and fuel under pressure into the retort, a casing extending around and over the retort and forming an annular generating chamber, the retort having a duct for discharging the products of combustion into the generating chamber, means for delivering feed-water into the generating chamber, a filling of crystals in the generating chamber, a foraminous member for supporting the crystals, and a steam outlet below said member.

3. A steam generating unit comprising a frame, a base mounted on the frame, a retort mounted on the base and containing a combustion chamber, rotary fuel and air pumps mounted on the frame and connected to deliver a mixture of fuel and air through the base into the retort, a casing forming a generating chamber around the retort, means for conducting products of combustion from the retort into the generating chamber, said combustion chamber being closed, except for said duct and the fuel inlet, means for delivering feed-water into the top of the generating chamber, and a steam outlet at the bottom of the generating chamber.

4. In a steam generator, the combination of a retort comprising sides and a substantially imperforate dome forming a combustion chamber, means for forcing air and fuel under pressure into said chamber, a casing forming a steam generating chamber extending around the sides and over the dome of the retort and heated by the combustion chamber, a mass of water distributing material substantially filling said generating chamber, means for delivering feed-water to the distributing material over the dome, and an outlet for the steam produced in the generating chamber.

5. In a steam generator, the combination of a retort comprising an annular side wall and a substantially imperforate dome forming a combustion chamber, means for forcing air and fuel under pressure into said chamber, a dome-shaped casing forming a steam generating chamber surrounding the side wall and extending over the dome and heated by the combustion chamber, a mass of water distributing material substantially filling the generating chamber and extending over the dome, a pipe connected to the top of the casing for delivering feed-water to the distributing material over the dome, and an outlet for the steam produced in the generating chamber.

6. In a steam generator, the combination of a retort comprising an annular side wall and a substantially imperforate dome forming together a combustion chamber, means for forcing air and fuel under pressure into said chamber, a dome-shaped casing forming a steam generating chamber surrounding the side wall and extending over the dome and heated by the combustion chamber, the top of said casing being shaped to substantially conform to the dome and being positioned in close proximity thereto, a mass of water distributing material substantially filling the generating chamber and extending over the dome, means for delivering feed-water to the distributing material over the dome, and an outlet at the bottom of the casing for the steam produced in said generating chamber.

7. In a steam generator, the combination of a retort comprising an annular side wall and a substantially imperforate dome formed of refractory and porous material, the wall and dome forming together a combustion chamber, means for forcing air and fuel under pressure into said chamber, a dome-shaped casing forming a steam generating chamber surrounding the side wall and extending over the dome and heated by the combustion chamber, the top of said casing being shaped to substantially conform to the dome and being positioned in close proximity thereto, means for delivering feed-water into the generating chamber and above the dome, the retort being provided at the side thereof with an opening for discharging the products of combustion into the generating chamber, and an outlet at the bottom of the casing for the steam produced in said generating chamber.

8. In a steam generator, the combination of a retort comprising an annular side wall and a substantially imperforate dome resting upon and supported by said wall, the dome and side wall forming together a combustion chamber, means for forcing air and fuel under pressure into said chamber, a casing extending around and over the retort and forming a steam generating chamber, the dome and side wall having portions of their contiguous margins spaced apart to form a slit for discharging the products of combustion into the generating chamber, means for delivering feed-water to the top of the generating chamber and above the dome, and an outlet for the steam produced in said generating chamber leading from the bottom thereof.

9. In a steam generator, the combination of a retort comprising an annular side wall and a substantially imperforate dome, said dome and side wall being formed of refractory and porous material and forming a combustion chamber, means for forcing air and fuel under pressure into said chamber, a casing extending around and over the retort and forming a steam generating chamber, means for delivering feed-water into the top of the generating chamber and above the dome, the retort having formed in the side thereof an opening for discharging the products of combustion into the steam generating chamber, and an outlet for the steam produced in said generating chamber leading from the bottom thereof.

10. In a steam generator, the combination of a retort comprising an annular side wall and a substantially imperforate dome resting upon and supported by the side wall, said dome and side wall being made of refractory and porous material and forming a combustion chamber, means for forcing air and fuel under pressure into said chamber, a casing extending around and over the retort and forming a steam generating chamber, the dome and wall having portions of their contiguous margins spaced apart to form a substantially annular slit for discharging the products of combustion into the generating chamber, means for delivering feed-water into the top of said generating chamber and above the dome, and an outlet for the steam produced in the generating chamber leading from the bottom thereof.

11. In a steam generator, the combination of a combustion chamber, means for forcing air and fuel under pressure to said chamber, a casing forming a steam generating chamber around the combustion chamber, a pipe connected to the top of the casing for delivering feed-water into said generating chamber, a mass of closely packed heat resisting material substantially filling the generating chamber and adapted to atomize the water, a ring-shaped screen at the bottom of the casing for supporting said mass, and means forming an annular steam outlet below the screen.

12. In a steam generator, the combination of a base having a socket formed in the central part thereof, a retort comprising a side wall and a dome forming a combustion chamber, the lower end of the retort being fixed in the socket and having an inlet, means for forcing air and fuel under pressure to the inlet, a casing supported by the base and forming a steam generating chamber extending around the side wall and over the dome and heated by the combustion chamber, and means for delivering feed-water to the top of the generating chamber, the base having formed therein an outlet for the steam produced in the generating chamber.

Signed at Chicago, Illinois, this 27th day of March, 1926.

EINER W. LARSEN.